J. RIDDELL.
SLOTTING AND SHAPING MACHINE.
APPLICATION FILED OCT. 6, 1905.
974,187.
Patented Nov. 1, 1910.
6 SHEETS—SHEET 1.
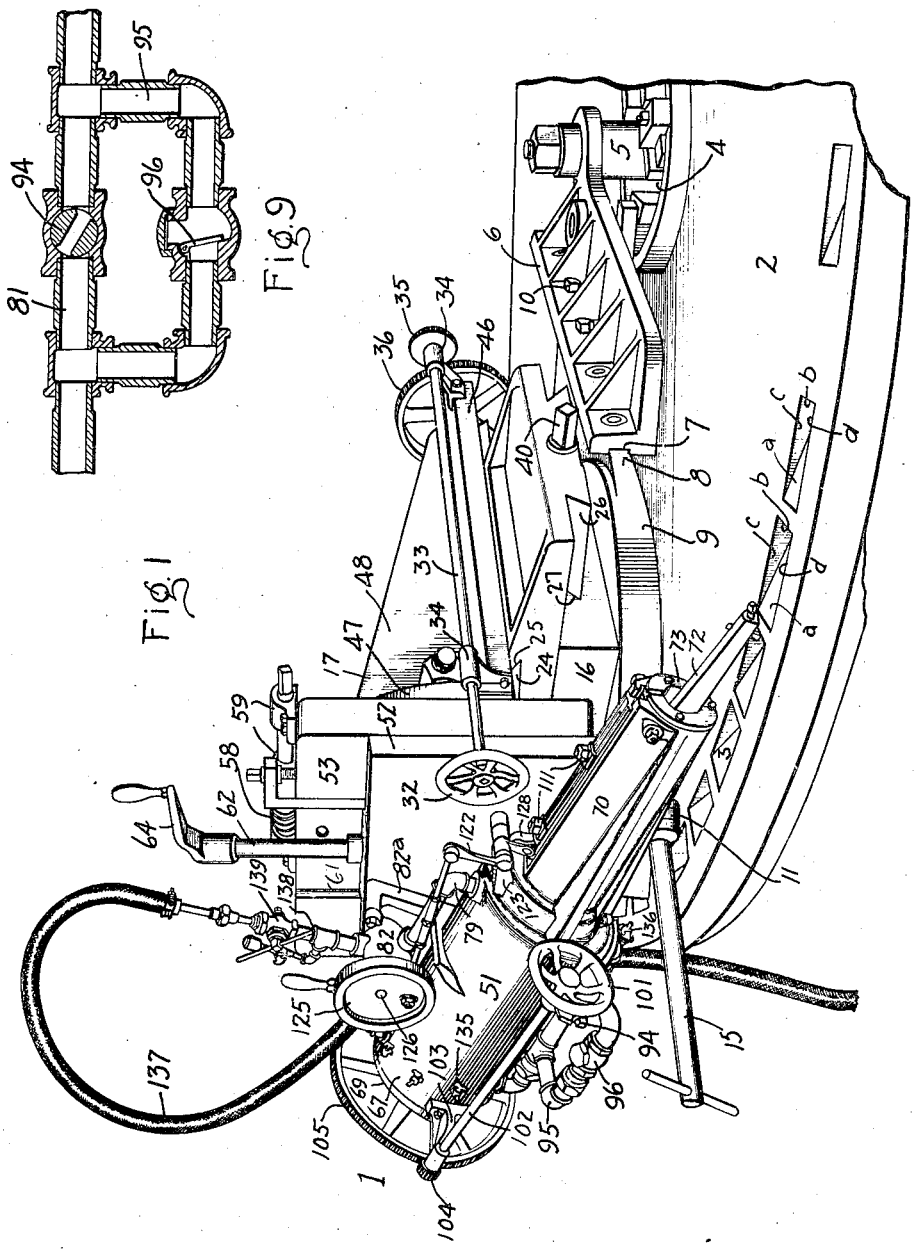
Witnesses
Lloyd C. Bush
Benjamin B. Hull
Inventor
John Riddell
by Albert S. Davis
Att'y.

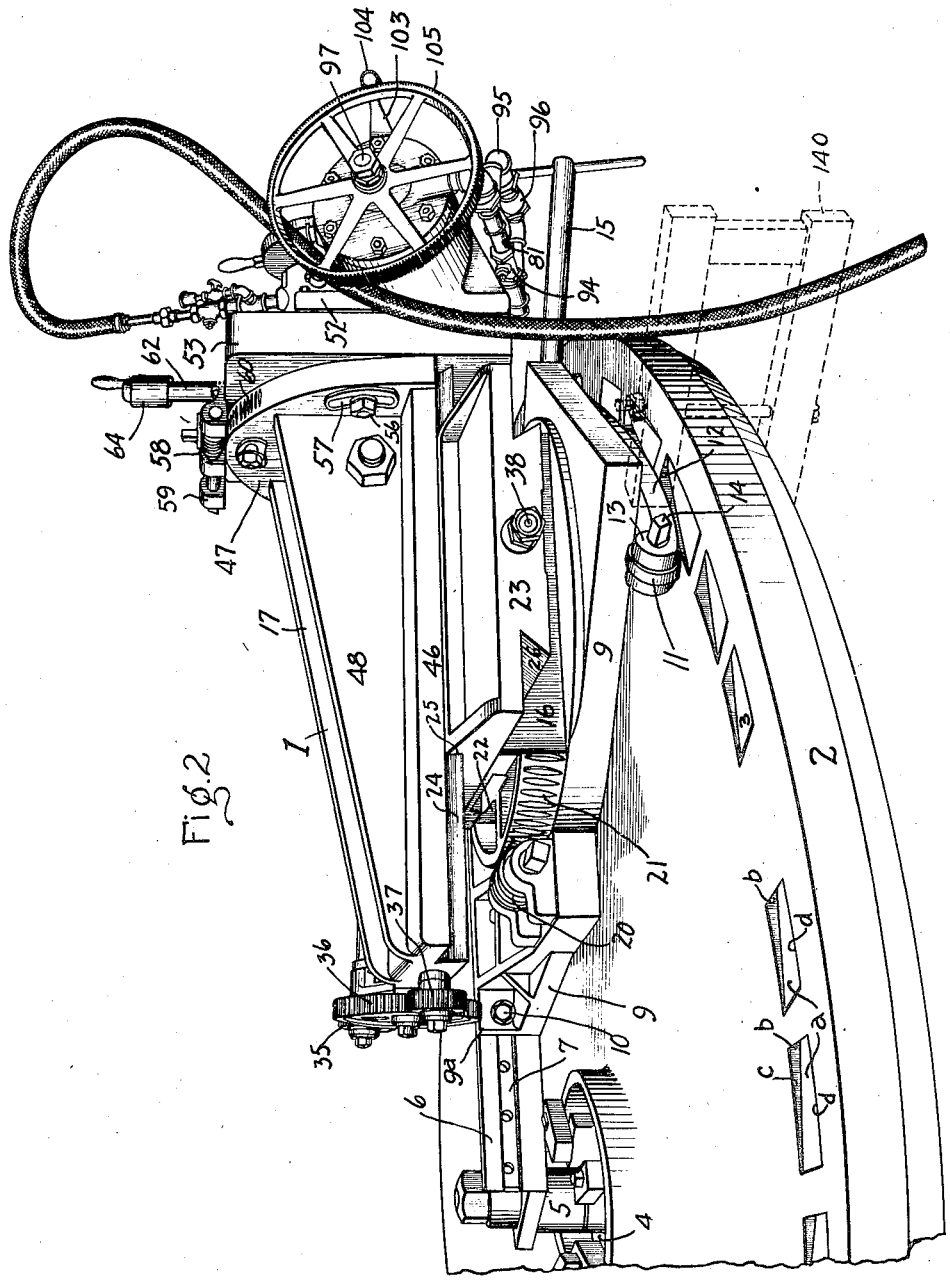

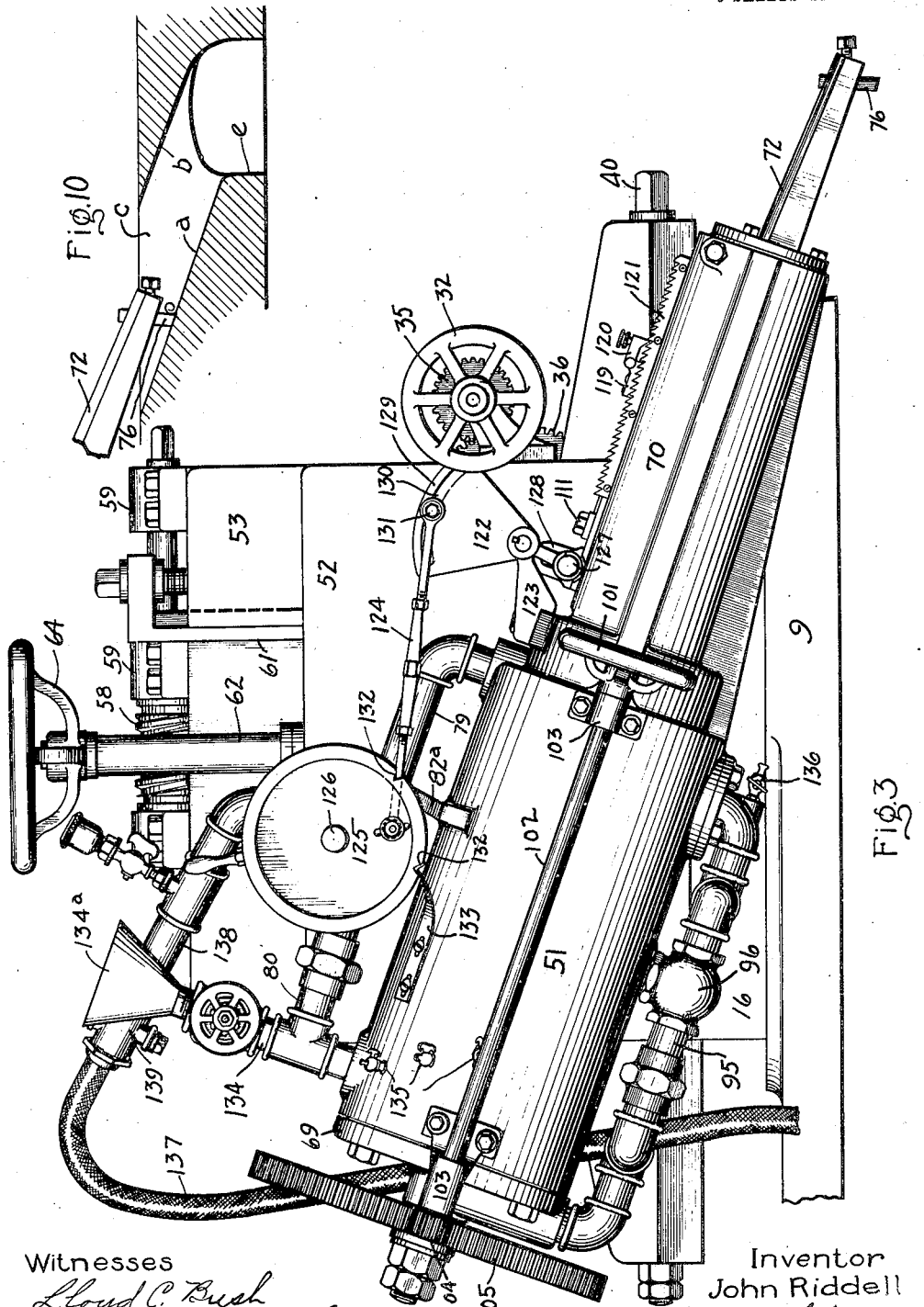

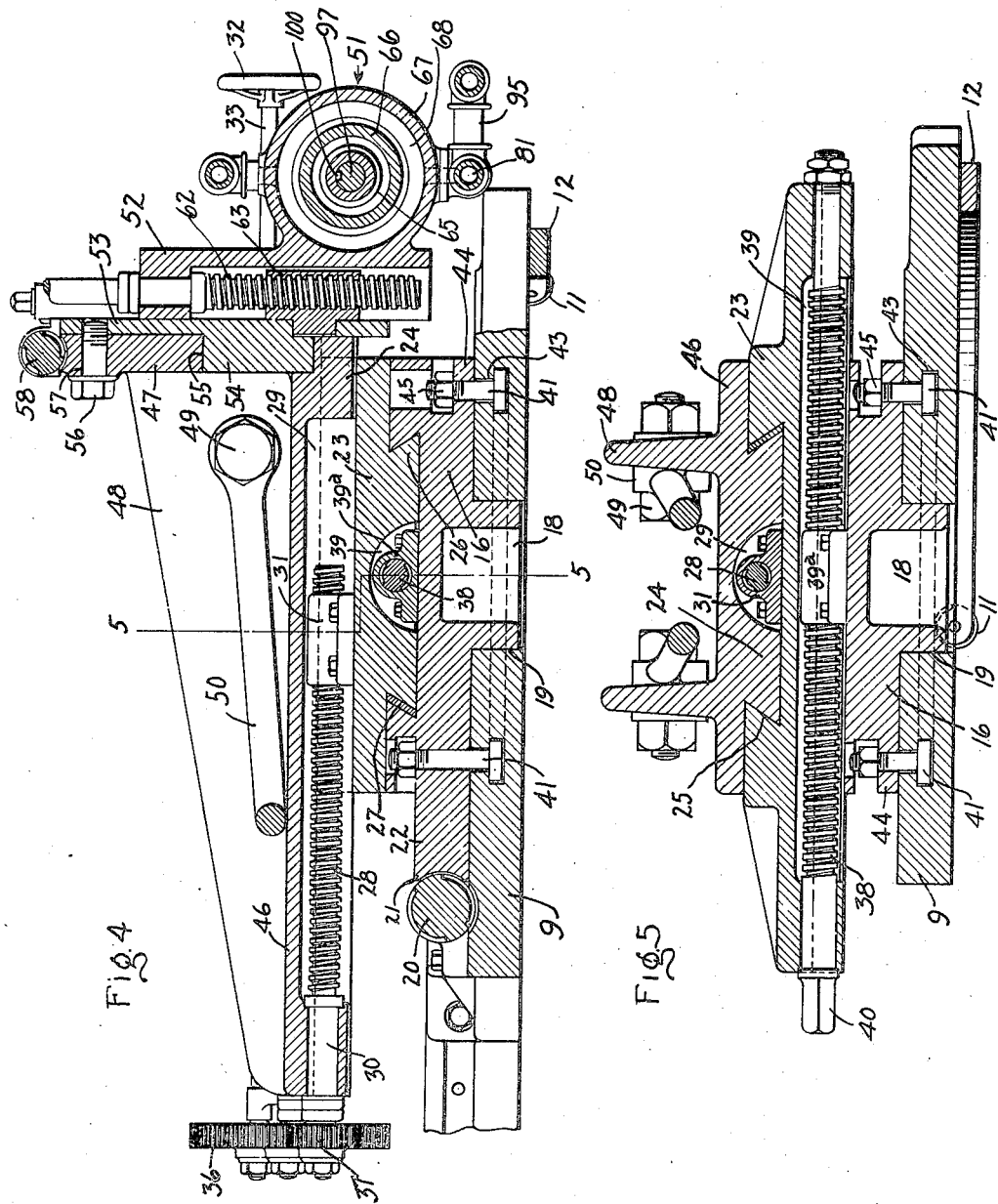

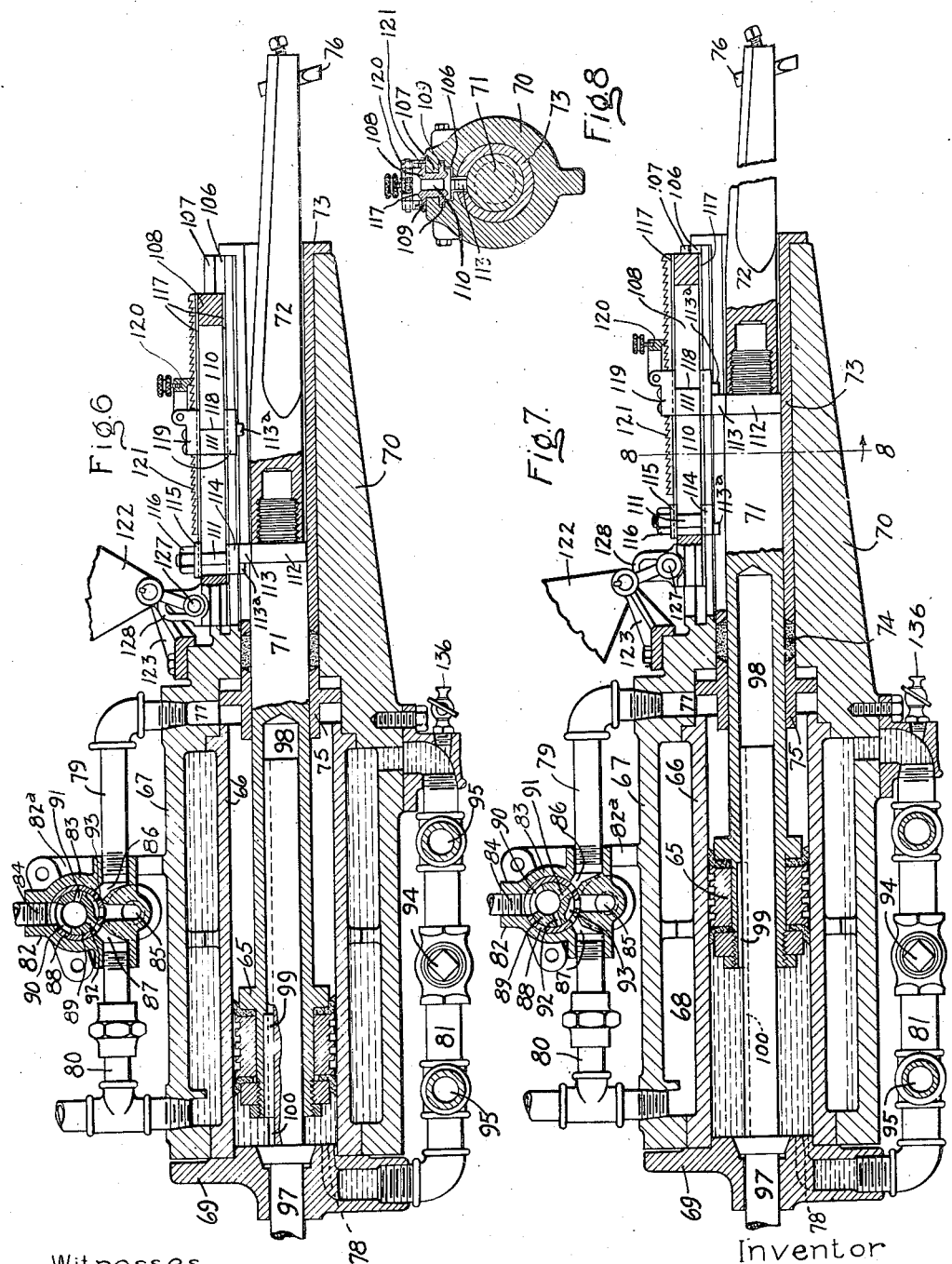

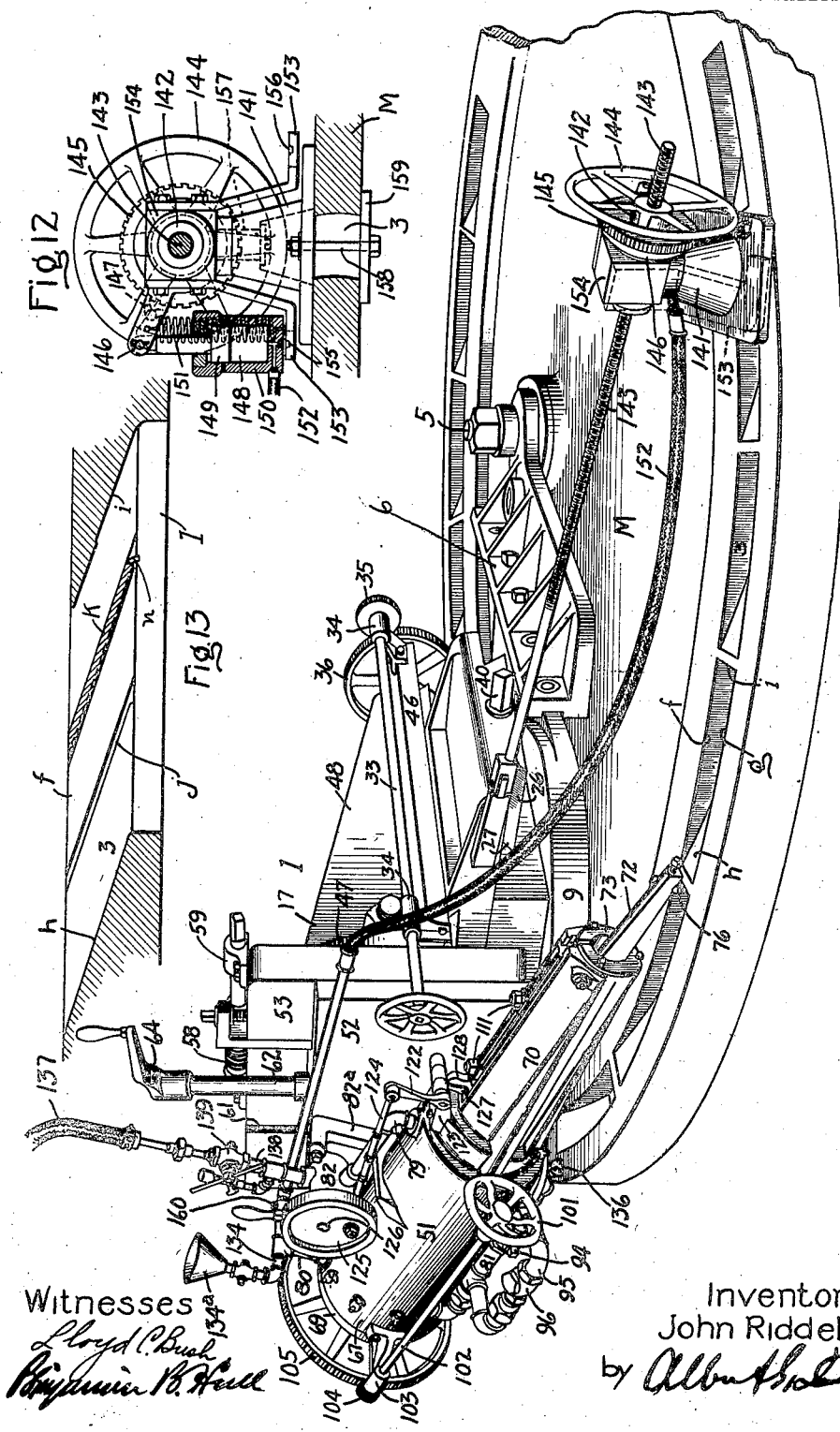

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

SLOTTING AND SHAPING MACHINE.

974,187.   Specification of Letters Patent.   Patented Nov. 1, 1910.

Application filed October 6, 1905. Serial No. 281,597.

*To all whom it may concern:*

Be it known that I, JOHN RIDDELL, a citizen of the United States, residing at Schenectady, county of Schenectady, and State of New York, have invented certain new and useful Improvements in Slotting and Shaping Machines, of which the following is a specification.

My invention relates to a portable, universal slotting and shaping machine of the pneumatically-actuated type.

I have designed the machine for shaping and slotting cast metal nozzles for elastic fluid turbines, and shall describe the same in this connection; such work being illustrative of what the machine is capable of doing. But I desire to be understood as not limiting the invention to this use.

For a detail understanding of the invention reference is to be had to the following description, taken in connection with the accompanying drawings, and the novel features of the invention will be pointed out in the claims appended thereto.

In the accompanying drawings which illustrate one embodiment of the invention, Figures 1 and 2 are perspective views of the machine mounted on the work, the views being taken from opposite sides thereof; Fig. 3 is a front view of the machine drawn on a somewhat larger scale; Fig. 4 is a longitudinal section of the machine; Fig. 5 is a transverse section on line 5—5 of Fig. 4; Figs. 6 and 7 are longitudinal sections of the pneumatic motor for actuating the tool showing the parts in different operating positions; Fig. 8 is a cross-section taken on line 8—8, Fig. 7; Fig. 9 is a detail sectional view of certain piping employed in connection with the motor; Fig. 10 is a fragmentary section of a portion of the work taken longitudinally through a nozzle, and showing the tool in operation; Fig. 11 is a perspective view of the machine mounted in position on the work and provided with mechanism for moving it from one nozzle to another; Fig. 12 is an enlarged view of the feed mechanism; and Fig. 13 is a longitudinal section through a nozzle, showing one of the partitions removed.

Referring to Figs. 1 and 2 of the drawings, 1 indicates the slotting machine and 2 the work; the latter representing a diaphragm of a turbine, which is provided with nozzles 3 formed therein. The diaphragm or work is fixed and supported in a horizontal position on a suitable holder or support. The machine is movably mounted on the work, and is adapted to be turned from nozzle to nozzle about the center of the work as the finishing proceeds. The machine may, if desired, be fixed and the work mounted to turn. The axis on which the machine or the work turns may be disposed in a different position from that shown to suit different requirements. Arranged in the shaft opening 4 of the diaphragm is a vertical pivot or shaft 5 secured at a point coinciding with the center of the opening, or what is the same, the center of the nozzle circle. The slotting machine is attached to the center pivot 5 by means of an arm or bracket 6 which is capable of turning thereon. The bracket is provided with a groove 7, Figs. 1 and 2, extending in a direction at right angles to the axis of the pivot, and fitted therein is a tongue 8 on the bed-plate 9 of the machine. The tongue is slidable in the groove to or from the pivot, so that the machine may be adjusted to work at different distances from the pivot 5. The bed-plate 9 of the machine is provided with a vertically disposed web portion $9^a$, Fig. 2, in which are openings, that register with corresponding openings in the bracket 6 for receiving bolts 10, which secure the plate and the bracket together. The pivot thus constitutes one point of support for the slotting machine. The outer end of the machine rests upon rollers 11 located at opposite sides of the bed-plate. These rollers are mounted on the bed-plate in a segmental strip or bar 12, which is secured to the plate in any suitable manner, and in the ends of the bar are formed bearing eyes 13 in which the journals of the rollers are mounted. The journal of each roller is squared at the outer end 14, Fig. 2, to receive a handle 15, Fig. 1, by means of which the rollers may be turned to move the machine bodily about its pivot in one direction or the other.

Mounted on the upper side of the bed-plate 9 is a rotatable table 16 which supports the head 17. The table is provided with a pivot 18, Figs. 4 and 5, whose axis is parallel with that of the central pivot 5. The pivot 18 engages a socket 19 in the bed-plate. To turn the table and the head carried thereby, a screw or worm 20, Figs. 2 and 4, located in fixed position on the rear portion of the bed-plate, meshes with teeth 21 on a sector-shaped portion 22 of the table. The head is adapted to be moved longitudinally, so that the tool can be fed radially for working on the surfaces *a* and *b* of the nozzles, Fig. 1, and also to be moved in a direction at an angle of 90 degrees with respect thereto for adjusting the tool to a position that will enable it to cut the surfaces of the nozzles. To this end the head is mounted to slide longitudinally on the intermediate plate 23. The plate 23 is mounted to slide back and forth on the rotatable table 16, at right angles to the direction of movement of the head and carries said head with it. The head is guided on the intermediate plate by a longitudinal dovetail tongue 24 on the bottom thereof, Figs. 1, 2, 4 and 5, which engages in a correspondingly shaped guideway 25 in the top surface of the intermediate plate. A similar dovetail tongue 26 and guideway 27 is provided between the table and the intermediate plate, the center lines of the latter guideway being at right angles to that of the guideway 25. In order to move the head along its guideway, a screw 28, Fig. 4, is employed. This screw is arranged in a longitudinal recess 29 on the under side of the head and is mounted in a bearing 30 on the head in which it is free to turn. The screw engages with a nut 31 disposed in the recess, and rigidly secured to the intermediate plate. The screw may be actuated in any suitable manner. I provide a manual means for actuating the screw, which includes a hand-wheel 32, Fig. 1, that is located at the front of the machine. The wheel is attached to a shaft 33, which is supported in brackets 34 on one side of the head, and on the rear end of the shaft is a pinion 35, that meshes with a gear 36 journaled on the head, which in turn meshes with a pinion 37 carried by the screw, Figs. 1, 2 and 4. Hence, by turning the hand-wheel 32, the head can be moved in one direction or the other on the intermediate plate, and in consequence the cutting tool is fed in a radial direction with respect to the pivot 5. For laterally adjusting the intermediate plate, and the head therewith, a screw 38, Figs. 4 and 5, arranged in a groove 39 in the plate engages with a nut 39ª rigidly secured to the rotatable table, Fig. 5. As shown in Figs. 1, 3 and 5, the end 40 of the screw is squared so as to receive an operating crank, whereby the tool may be adjusted in a direction to cut the surfaces of the nozzles.

The rotatable table is secured to the bed-plate by bolts 41 arranged at diametrically opposite points, Figs. 4 and 5, which are disposed in an inverted T-shaped annular groove 43 in the bed-plate. The heads of the bolts engage in the enlarged portion of the groove, and the upper ends thereof pass through openings in a peripheral flange 44 on the table to receive nuts 45 by which the parts are held together.

The head 17 comprises a bracket-shaped member having a horizontal web 46 and a vertical web 47, and both are strengthened by two parallel ribs 48 extending longitudinally of the head. The web 47 is adapted to support the tool and the motor for driving it. Arranged between the ribs substantially in the center line of gravity of the machine, is an inverted U-shaped link 50 which is pivoted at its ends on the bolts 49. This link is used as a means for moving the machine by a shop crane.

The motor 51, which I have elected to illustrate in the present embodiment of the machine, is of the pneumatically-actuated reciprocating type. Any other form of motor may be used, however, as far as the broad features of the invention are concerned. The motor is supported in such a manner that the tool can be moved to or from the work in a plane perpendicular to the latter, and also be moved to any angular position relatively to the plane of the work for finishing nozzles having different angles of discharge. To this end, the motor is mounted on a vertically disposed slide 52 and is shown as integrally formed therewith, Figs. 1, 2 and 4. The slide extends parallel to the vertical web 47 of the head, or transversely to the plane of the work, and between the vertical slide 52 and the web 47 is a pivotally supported carriage or holder 53, that carries the motor. The carriage 53 is provided with a pivot 54 which engages a socket 55 in the vertical web of the head, and is held in position thereon by means of bolts 56, Figs. 2 and 4. The bolts extend through arc-shaped slots 57 that are struck from the center of the pivot 54, and screw into tapped openings in the carriage, serving thereby to clamp the latter to the head. The carriage can be turned about its pivot by an adjusting screw or worm 58 mounted in brackets 59 on the upper end of the carriage, Fig. 2, and meshing with the teeth of the sector-rack 60 formed on the vertical web 47 of the head. The right end of the screw is made square to receive an operating crank by which the screw is turned to adjust the carriage. The axis of the tool, when the latter is in mid-position as shown, is disposed in a plane which is more or less inclined to that of the work, and by means of the pivotally-mounted carriage the tool is capable of being adjusted to one side or the other of the mid-position for operating on nozzles having different angles of discharge. In practice, the angle of discharge does not vary over a very wide range, so that provision for a comparatively small adjustment is sufficient, but the construction can be such as to permit of unlimited angular adjustments to adapt the machine for different classes of work. The tool is adjusted to or from the work by being vertically movable on the head. A dovetailed tongue and grooved connection 61, Fig. 1, is provided between the carriage 53 and the slide 52 of the motor. The center line of the connection 61 is approximately parallel with the axis of the center pivot 5 when the carriage is in its mid-position. A vertical adjusting screw 62, Fig. 4, is provided in the slide 52, which engages with a nut 63 secured to the pivoted holder or carriage. At the outer end of the screw, that projects beyond the slide, is an operating handle or wheel 64, Figs. 1 and 3, by which the screw can be rotated. The screw, in addition to being used for adjusting the tool to or from the work is used for feeding it during the cutting operation on walls $c$ and $d$ of the nozzles. Thus it will be seen that for shaping the tangential walls $c$ and $d$ the feed of the tool is accomplished through the handle 64, and for shaping the walls $a$ and $b$, the feed of the tool is accomplished through the hand wheel or crank 32.

The pneumatically-actuated motor comprises a piston 65, Figs. 4, 6 and 7, which reciprocates in a cylinder 66. The cylinder is arranged concentrically within a cylindrical casing or shell 67, formed integral with the slide 52 and in which the cylinder fits in such a manner as to provide an annular space or reservoir 68, that is adapted to contain the hydraulic medium through which the compressed air or other elastic fluid under pressure acts on the piston during the working stroke. The cylinder is inserted into the casing from one end that is normally closed by a removable head 69, bolted in place, Figs. 2 and 6. The opposite end of the casing is cast with a hollow extension 70, which constitutes the guide for the piston-rod 71, and the tool-bar 72 secured thereto. The extension is provided with a sleeve or lining 73 for the piston rod, and between the inner end of the same and the adjacent end of the cylinder is a packing comprising a packing-ring 74 and a gland 75, which prevents leakage of the elastic medium that operates on the forward side of the piston. The tool-bar 72, which is screwed to the outer end of the piston-rod, projects beyond the end of the extension 70, and carries the cutter or tool 76 at its outer end. The piston 65 is of the double-acting type, therefore the cylinder is provided with ports 77 and 78 at its opposite ends, each of which serves to admit and exhaust the medium that operates the piston. The port 77 is connected with a source of elastic fluid, such as compressed air, through a pipe or conduit 79. Connected preferably with the same source is a conduit 80, which is adapted to supply elastic fluid to the reservoir 68 to act upon an inelastic liquid medium in the same when the piston is to be driven on its working stroke. The reservoir is connected with the liquid admission port 78 by a conduit 81, Figs. 1 and 6, through which the liquid is delivered to the cylinder when the reservoir is subjected to elastic fluid pressure. At the junction of the conduits 79 and 80 is a three-way admission and exhaust valve 82 which is supported on the casing 67 by a bracket 82$^a$, Figs. 1, 6 and 7. This valve admits compressed air to the reservoir for forcing the liquid into the cylinder to cause the forward stroke of the piston, while simultaneously exhausting the air from the forward side of the piston. It also alternately admits compressed air to the forward side of the piston to cause the return stroke thereof, while simultaneously exhausting the air from the reservoir to permit the return of the liquid and hence the return stroke of the piston. The three-way valve, Figs. 6 and 7, comprises a casing 83 having an inlet passage 84 connected with a source of air or other elastic fluid under pressure, an exhaust passage 85 connected with the atmosphere, and passages 86 and 87 connected respectively to the conduits 79 and 80. Within the casing is a sleeve 88 provided with openings which permanently register with the passages enumerated. Within the sleeve is a hollow cylindrical valve 89, that is provided with an enlarged inlet port or opening 90 which is adapted to permanently communicate with the inlet passage 84, separate admission ports 91 and 92, which communicate one at a time with their respective passages 86 and 87, and an enlarged exhaust port 93, the latter being arranged to connect one of the passages 86 and 87 with the exhaust passage 85, while the other passage registers with its corresponding admission port, thus permitting air to be supplied to one conduit and exhausted from the other. The valve is adapted to be automatically oscillated so that air pressure is applied alternately and in regular succession, directly on the front side of the piston and indirectly through the liquid medium to the rear side so that the piston is reciprocated.

In order to regulate the speed of the cutting stroke of the tool, a throttle valve 94, Figs. 6 and 9, is provided in the connection 81 between the reservoir and the cylinder of the motor, by which the rate of flow from the former to the latter may be varied, and consequently the rate of travel of the piston. In order to permit a quick return stroke of the piston a by-pass 95 is connected around the throttle valve, whereby a relatively unobstructed return of the fluid to the reservoir is permitted. A check valve 96 is arranged in the by-pass, which opens toward the reservoir, but closes toward the cylinder thus preventing the liquid from flowing thereto through the by-pass, while permitting an unobstructed reverse flow. Hence by this arrangement the speed of the forward stroke of the tool may be regulated to take place at a slow or quick rate, while insuring a quick return stroke.

It is necessary to adjust the tool about its axis in order to operate on the different walls of the nozzles. This is accomplished by means of a spindle 97, extending through the head 69 of the motor, and telescoping in the bore 98 in the inner end of the piston-rod, Figs. 6 and 7. The spindle and the piston rod are splined together by means of a feather 99, rigidly connected to the latter and movable in a groove 100 extending longitudinally of the spindle. By this means the piston is capable of reciprocating independently of the spindle, and of being at the same time adjusted by the latter about its axis to change the position of the tool. The spindle is adjusted by means of a hand-wheel 101, Figs. 1 and 3. The wheel is mounted on a shaft 102 supported in brackets 103 on the motor casing and connected with the spindle by gearing comprising a pinion 104 on the shaft and a gear 105 on the spindle. By moving the hand-wheel 101, the spindle is rotated and with it the piston rod and the tool bar. This mechanism may be employed for feeding the tool about its axis for cutting a cylindrical opening, but in cutting a nozzle, it is employed for setting the tool to work on one wall after another.

The length of the stroke of the motor may be varied as desired. This is accomplished through an adjustable stop mechanism actuated by the reciprocation of the tool-bar, or piston rod, and operating on the controlling valve 82 of the motor. The extension 70 of the casing is longitudinally slotted, as is also the sleeve 73, Figs. 6 and 7, the slot 106 of the extension being correspondingly undercut in its opposite walls, so as to provide symmetrical overhanging shoulders 107, Fig. 8. Arranged in the slot is a stop-carrying frame 108 whose opposite longitudinal walls are provided with laterally extending flanges 109 which engage on the top and bottom of the overhanging portions 107 of the extension, whereby the frame is slidably mounted in the slot of the latter. The frame itself is provided with a longitudinal slot or opening 110, in which are adjustable stops 111 for limiting the longitudinal movements of the tool-holder. On the reciprocating element of the motor is a collar 112, secured between the connected ends of the piston rod and tool-bar, which collar is provided with an upwardly extending projection or engaging lug 113 that is disposed between depending lugs 113ᵃ on the stops so as to engage therewith at the ends of the strokes and cause a slight motion to be imparted to the stop-carrying frame. This movement of the frame is communicated to the controlling valve through a suitable mechanism so that the motive fluid is caused to act alternately on the opposite sides of the piston at the proper intervals.

Referring to Figs. 6 and 7, the adjustable stop 111 at the left, comprises a bolt whose head engages with the under side of the frame 108, and whose shank extends through the opening 110 thereof. On the threaded end of the shank is arranged a plate 115 that overhangs the upper surface of the frame, and by means of the nut 116 the bolt and plate 115 are clamped to the frame. The upper and lower surfaces of the frame are provided with longitudinal ridges 117, Fig. 8, and the head 114 of the bolt and the plate 115 are correspondingly grooved to engage with the ridges for preventing the stop from turning and the depending projections 113ᵃ on the head of the bolt from moving out of alinement with the projection 113 on the piston rod. The stop at the right in Figs. 6 and 7 comprises a shank 118 and portions 119 that extend laterally from the shank and slide along the top and bottom surfaces of the frame so that the stop may be freely moved on the latter. On the top plate is pivoted an adjusting latch or pawl 120, which is adapted to engage with the teeth of longitudinally extending racks 121 mounted on the frame at opposite sides of the slot 110. The right hand stop may be readily adjusted while at the same time it prevents creeping due to the hammer blow effect between the projections 113 and 113ᵃ. In Fig. 1 both stops 111 are shown similar to the one at the left hand in Fig. 6.

The mechanism between the stop-carrying frame and the controlling valve of the motor comprises a lever 122 mounted on the bracket 123 secured to the motor casing, and a pitman 124 that is connected to the lever 122 at one end and at the other to a hand-wheel 125 attached to the spindle 126 of the controlling valve, Fig. 1. The lower end of the lever 122 is provided with a pin 127 which loosely engages in a slotted lug 128 on the stop-carrying frame so as to enable the rectilinear movement of the frame to be converted into curvilinear movement of the lever. As shown in Figs. 3, 6 and 7, the upper end of the lever connected with the pitman comprises a sector 129 that is provided with a segmental slot 130 in which is a bolt 131 that adjustably connects the pitman and the sector.

The circumference of the hand-wheel of the controlling valve 82 is provided with notches 132 at two points, Fig. 3, and bearing against the circumference of the wheel is a spring 133 whose end is adapted to engage in the notches and prevent overtravel of the controlling valve 82. The notches are arranged at points corresponding to the positions of maximum opening of the valve, so that when the spring engages in one notch the valve admits compressed air through one inlet port and when it engages in the other notch the valve admits air through the other inlet port. When the hand wheel is turned to a point where the spring occupies a position mid-way of the notches the valve is in a position cutting off the supply of compressed air to the motor.

Connected with the conduit 80, Figs. 3 and 11, is a valve-controlled filling connection 134, which is provided with a funnel 134ª, the said connection being employed for supplying the reservoir with liquid. In order to ascertain the level of the liquid in the reservoir at filling, or at any other time, gage cocks 135 are provided in the wall of the casing at different levels that communicate with the interior thereof. In order to empty the reservoir a drain cock 136, Figs. 3 and 6, is arranged in the connection between the reservoir and piston cylinder.

The motive fluid which furnishes the power for operating the motor may be air, steam or any other elastic fluid. It is supplied to the motor through a flexible tube 137 connected with the inlet passage 84 of the controlling valve by a connection 138 in which is located a shut-off valve 139, Fig. 1. In starting the motor, the valve 139 is first opened, and the motor controlling-valve, which is normally in mid-position, is turned in one direction or the other by hand to cause the ports 91 and 92 to register with their respective passages 86 and 87 to supply the fluid to actuate the piston. After being once started the motor continues to operate until the operator turns the controlling valve to mid-position, or cuts off the supply of motive fluid by closing the shut-off valve 139.

As shown in Figs. 1 and 10, the tool is operating on the inclined wall a of one of the nozzles, the cut being made from the discharge end of the nozzle toward the bowl e thereof. In setting the tool for this operation the position of the slotting machine on the supporting bracket 6 is first determined in accordance with the radial dimension of the work to be operated on. This adjustment between the machine and the bracket may best be done with the machine supported wholly or largely by a shop crane. After adjustment the machine is placed upon the work which has been previously arranged upon a suitable holder or support, and the bracket is connected with the central pivot 5. After this an abutment or clamp 140 is secured to the work as shown in dotted lines in Fig. 2, which abuts against the bed-plate and serves to receive the reacting thrusts of the cutting strokes. The next step is to set the tool so that it will reciprocate in a plane tangential to and inclined to the plane of the work and at an angle corresponding to the angle of discharge of the nozzle. To set the tool to reciprocate in a plane tangential to a given point of the work, the screws 20, Fig. 2, 28 and 38, Fig. 4, are severally manipulated by the attendant until the proper position is obtained, while by adjusting the screw 58, Fig. 2, the tool can be set to reciprocate in a plane inclined at the desired angle to that of the work. Assuming the tool to be in the position shown in Fig. 1, and it is desired to begin operation: the attendant then starts the motor into operation by turning the hand-wheel 125 to the left so as to admit air to the reservoir and thereby cause the liquid therein to impel the piston forward on the cutting stroke. Once started the motor continues to reciprocate until stopped by the attendant closing the controlling valve 82. The tool makes a cut on each forward stroke and at the end of the return strokes it is fed radially step by step toward the wall c until the wall a is finished. If it is required to make a second cut the tool is lowered sufficiently by means of the screw 62 and crank 64 to take off the proper thickness of metal, and the feed of the tool is then made in the reverse direction or toward the wall d, this being accomplished by turning the hand-wheel 32 in the opposite direction to that during the first cut. After the wall a of the nozzle is finished the motor is stopped and the tool adjusted for working on any of the other three walls. For instance to work on the wall b the tool is turned on its axis through 180 degrees to present its cutting edge to the surface at the required angle, and the screw 20 is rota ed to move the tool into working relation to the wall. The tool is fed in the same manner as during the shaping of the wall a. For shaping either of the side or tangential walls c or d, the tool is turned through 90 degrees and by means of the hand-wheel 32 is adjusted into working relation to the wall to be operated on. The motor is then started and as the cutting strokes proceed the tool is fed by means of the hand-wheel 64, which raises or lowers the tool to make the successive cuts. After all the walls of one nozzle are shaped, the abutment 140 is unclamped from the work and the machine moved along to the next nozzle by means of the device 15, Fig. 1. When the machine is placed in proper position the abutment 140 is again clamped in place and the shaping operation continued as just described.

Referring to Fig. 11, the machine is shown equipped with mechanism for feeding it bodily around the central pivot so that the tool can describe a curved path for shaping the curved walls of sectionalized nozzles. Each of these nozzles, as shown in Figs. 11 and 13, comprises a segmental opening preferably cast in the diaphragm of the turbine, or other part intended to support the nozzles. The side walls $f$ and $g$ of the opening are shaped on an arc corresponding to the curvature of the row of buckets of the wheel against which the nozzles discharge, while the end walls $h$ and $i$ are radial with respect to the axis of the diaphragm. The curved walls $f$ and $g$ are provided with opposed slots or grooves $j$ which receive removable partitions $k$, that divide the segmental opening into separate and closely-associated fluid discharging passages. These passages communicate with a common chamber or bowl $l$ which receives the motive fluid discharged from the wheel buckets of the preceding stage of the turbine, or receives fluid from the steam chest when the nozzles are located in the first stage.

The work M, Fig. 11, on which the machine is operating represents a diaphragm of a turbine that is provided with a row of nozzle openings adjacent to the periphery thereof, such as is customarily employed for the last stage. In the present instance each opening is intended to have three discharge sections or passages. The work or diaphragm is supported in any suitable manner, and the machine, which is the same as that previously described with the exception of the rollers 11, Fig. 1, is mounted on the work so as to be capable of turning about the central pivot 5 arranged in the shaft opening of the diaphragm. The bed-plate of the machine rests directly upon the work and is adapted to slide thereon during the feeding of the machine around the pivot. The abutment 140 is dispensed with as the feed mechanism itself takes the thrust of the tool during the cutting stroke.

The feed mechanism comprises a stationary abutment 141 supported by the work, in which is rotatably mounted a nut 142. The nut engages a screw 143 which is hinged or otherwise connected at one end to a suitable part of the machine proper. By this arrangement the machine can be held in fixed position during the cutting strokes and during the shaping of the end walls of the nozzle openings, as will be explained hereinafter, and be moved toward or away from the abutment by rotating the nut 142 for adjusting the tool from one point to another in the opening, or causing it to feed in a curved path for shaping the curved walls of the opening. Secured to the nut 142 is a hand-wheel 144 by means of which the nut can be readily manipulated for imparting a quick movement to the machine to adjust the tool from point to point in the nozzle opening. In order to operate the nut step by step to impart a regular feed movement to the machine during the shaping of the curved walls of the openings, an automatically actuated device is employed. This includes a ratchet wheel 145 carried rigidly by the nut. Fulcrumed on the nut adjacent to the ratchet wheel is a lever 146 which carries a pawl 147, shown clearly in Fig. 12. The lever is actuated by means of a motor 148 which comprises a piston 149 connecting with the lever, and a cylinder 150. The motor may be double-acting if desired, but I have shown one which is single-acting. It operates the lever in the direction to cause the nut to turn, while the weight of the piston and lever, or a spring 151 connected with the lever, returns the latter and also the piston to the initial position. The cylinder is connected with the same source of motive fluid which supplies the motor for operating the tool by means of a flexible tube 152 which is connected at a suitable point in the supply conduit 80, so that when compressed air is supplied to move the tool piston on its cutting stroke, air will also be supplied to the motor of the feed mechanism. The load on the latter motor is relatively small and the stroke is consequently quick so that the feed takes place at the initial part of the stroke before the tool begins cutting. In order that the ratchet, or step-by-step device, can operate the nut, and thereby feed the machine in both directions, the motor 148 and the lever 146 are capable of occupying a position at one side or the other of the abutment. Two brackets 153 are arranged on the head 154 of the abutment on opposite sides thereof, upon either of which the motor may rest. In Fig. 11, the front bracket is shown dotted so as to expose the parts lying under it. A centering stud 155 on the bottom of the cylinder is adapted to engage in a depression 156 in each bracket so as to steady and retain the cylinder in proper position. As the machine is moved in one direction or the other about the central pivot 5, the angle of the screw 143 constantly changes and to permit of this movement the head 154 of the abutment is pivoted or swiveled on the base by means of the pivot 157, shown in dotted lines Fig. 12. The abutment as a whole is removably secured to the work by being bolted thereto, the bolt 158 extending through a nozzle opening, and clamping the abutment to the diaphragm by means of the plate 159, Fig. 12.

Assuming the machine to be operating in the position shown in Fig. 11, the tool is shaping the end wall $h$ of a nozzle opening. In this case the valve 160 in the supply connection 152 is closed so as to prevent the motor 148 of the ratchet-feeding device from operating. In other words the machine is held stationary, and the feed of the tool is controlled by the hand-wheel 32. To shape the other end wall $i$ the tool is set to extend in the opposite direction to that shown by means of the wheel 101 and the machine is moved toward the abutment by means of the hand-wheel 144 until the tool is in proper relation to the wall. The tool is adjusted by the wheel or lever 64 to make the required depth of cut, and the motor is then started. The feed of the tool is obtained through the hand-wheel 32 as was the case in shaping the wall $h$. In order to shape the curved side walls $f$ and $g$, the tool is turned a quarter turn by the wheel 101 and set to make the required depth of cut by means of the wheel 32. The valve 160 is next opened so that when the air is supplied to the tool-operating motor it will also be supplied to the motor of the feed mechanism, as described hereinbefore. The controlling valve 82 is now opened by the attendant and the tool set into operation. The feed of the tool is automatically taken care of by the feed mechanism which moves the tool step by step in a curved line in the plane of the work. When the curved surface is finished the attendant shuts off the power and stops the motor. If a second cut is required, the tool is again set to make the proper depth of cut, and the motor 148 of the feed mechanism is changed over to the other position so that it will work in the reverse direction and feed the machine in the direction opposite to that traveled during the first cut. The supply of power is again opened and the second cut is made as before. The other curved wall of the opening is finished in the same manner. It is to be noted that by reason of the tool reciprocating in an inclined direction, and feeding in a curvilinear path, the wall $f$ of the opening will be slightly concave, while the wall $g$ will be slightly convex, as shown in Fig. 12. After the side walls are finished the slots for receiving the partitions are next made. The valve 160 is first closed and by means of the hand-wheel 144 the machine is moved to bring the tool into the proper position with respect to the point where the slot is to be cut. In order to permit the hand-wheel to be freely manipulated in either direction at any time, the pawl is released from the ratchet wheel and permitted to hang in inoperative position. With the tool adjusted to the desired position the motor is started. As the valve 160 is closed the feed mechanism is inoperative and the tool reciprocates in one plane so that by operating the hand-wheel 32 the tool is fed radially and cuts the slot, as shown in Fig. 13. The slots are made one by one until all four are finished. This completes the operation on one nozzle. The abutment is next unbolted and the machine moved bodily along far enough to permit the abutment to be secured at the next nozzle, after which the work proceeds as before. The wall at the nozzle end of each slot, Fig. 13, as indicated at $n$ is slightly cut away, as by means of a file, and lugs formed at the corners of the partitions are turned down against the cut away portions so as to retain the partitions in place when the diaphragm is in position in the turbine.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new, and desire to secure by Letters Patent of the United States, is,—

1. A shaping and slotting machine comprising a reciprocable tool, a motor for reciprocating the tool, and means for supporting and adjusting the tool comprising three members one of which is movable in a direction at right angles to the line of reciprocation of said tool, a second member on which the first is mounted for rectilinear movement in said direction, a support on which the second member is mounted for rectilinear movement, a third member mounted for rectilinear movement on the first and carrying the tool, the second and third members being movable in directions at right angles to each other and to the direction of movement of the first member and means for moving said members.

2. In a machine of the character described, the combination of a reciprocable tool, means for varying the direction of reciprocation of the tool about two axes at an angle to each other, and means for feeding the tool in two planes transverse to said axes.

3. In a machine of the character described, the combination of a tool, a holder for the tool which is mounted for rotary and reciprocating movement, a motor for reciprocating the holder and the tool, means for feeding the tool with respect to the work in a plurality of planes at an angle to each other, one of said planes being parallel to the line of reciprocation, and a device for turning the holder to present the tool at the proper cutting angle to the surfaces of said planes.

4. In a machine of the character described, the combination of a reciprocable tool, means supporting the tool by which the latter is adjustable about two right angularly disposed axes, and means for feeding the tool with respect to the work in planes transverse to said axes.

5. In a machine of the character described, the combination of a reciprocable tool, a support for the tool which includes separate means for adjusting the tool about two right angularly disposed axes, and means for feeding the tool in a plurality of planes at an angle to one another, one of which is parallel to one of said axes.

6. In a machine of the character described, the combination of a reciprocable tool, a motor for reciprocating it, separate means for feeding the tool in two planes at an angle to each other, and a device for positioning the tool to present it at the proper cutting angle to the surfaces of said planes.

7. In a machine of the character described, the combination of a reciprocable tool which is independently adjustable about different axes at an angle to one another, and separate means for moving the tool rectilinearly in planes parallel to the axes around which it is adjustable.

8. In a machine of the character described, the combination of a reciprocable tool adjustable about separate axes at an angle to one another, independent means for moving the tool in directions at right angles to each other and in a plane parallel to one of the axes around which the tool is adjustable, and a means for moving the tool in a direction parallel to the other axis of adjustment.

9. In a machine of the character described, the combination of a reciprocable tool, a motor therefor, and mechanism supporting the tool and the motor, which comprises means for angularly and rectilinearly adjusting the tool in a common plane, and means for angularly adjusting the tool in another plane at an angle to the first plane and also rectilinearly in two directions at right angles to each other.

10. In a machine of the character described, the combination of a tool, a motor for reciprocating it, means for angularly adjusting the tool about the line of reciprocation, and mechanism supporting the tool and motor which comprises means for rotatably adjusting the tool about two right angularly disposed axes, and means for feeding the tool.

11. In a machine of the character described, the combination of a tool, a motor for reciprocating it, means for angularly adjusting the tool about the line of reciprocation, and mechanism supporting the tool and motor which comprises means for rotatably adjusting the tool about two right angularly disposed axes, and separate means for feeding the tool in two different planes.

12. In a machine of the character described, the combination of a tool, a motor for reciprocating it, means for angularly adjusting the tool about the line of reciprocation, and mechanism supporting the tool and motor which comprises means for rotatably adjusting the tool about two right angularly disposed axes, and separate means for moving the tool rectilinearly in three different directions.

13. In a machine of the character described, the combination of a tool, a motor for reciprocating it, means for angularly adjusting the tool about the line of reciprocation, and mechanism supporting the tool and motor which comprises means for rotatably adjusting the tool about two right angularly disposed axes, and separate means for feeding the tool in planes parallel to the axes of adjustment of the tool.

14. In a machine of the character described, the combination of a tool, a motor for reciprocating it, means for angularly adjusting the tool about the line of reciprocation, and mechanism supporting the tool and motor which includes means for rotatably adjusting the tool about two right angularly disposed axes, separate means for moving the tool in directions at right angles to each other and in a plane parallel to one axis around which the tool is rotatably adjustable, and a means for feeding the tool in a direction parallel to the other axis.

15. In a machine of the character described, the combination of a bed-plate, a rotatable table on the bed-plate, a head mounted on the table, a carriage on the head which is rotatable on an axis extending toward that of the table, a tool holder, and a motor on the carriage for reciprocating the tool holder.

16. In a machine of the character described, the combination of a bed plate, a table rotatably mounted on the bed plate, a head which is mounted on the table, a carriage on the head which is rotatable about an axis transverse to the axis of rotation of the table, a slide on the carriage, and a reciprocable tool-holder carried by the slide.

17. In a machine of the character described, the combination of a bed-plate, a rotatable table on the bed-plate, a head mounted on the table, a carriage on the head which is rotatable on an axis at right angles to and extending toward the axis of rotation of the table, a slide on the carriage which is movable in a plane parallel to the axis of rotation of the table and movable with the carriage, and a reciprocable tool holder on the slide which is movable therewith.

18. In a machine of the character described, the combination of a bed-plate, a rotatably adjustable table on the bed-plate, a head mounted on the table, a carriage on the head which is rotatable on an axis transverse to the axis of rotation of the table, a slide on the carriage which is movable in a plane parallel to the axis of rotation of the table and movable with the carriage, a reciprocating motor on the slide which is movable therewith, and a tool holder reciprocated by the motor and adjustable with the slide.

19. In a machine of the character described, the combination of a bed-plate, a rotatable table mounted on the bed-plate, a rectilinearly adjustable head on the table, a carriage on the head which is rotatable on an axis disposed parallel to the direction of rectilinear adjustment of the head, a slide mounted on and movable with the carriage, which moves at right angles to the plane of rectilinear adjustment of the head, and a reciprocable tool holder on the slide.

20. In a machine of the character described, the combination of a bed-plate, a rotatably adjustable table mounted thereon, an intermediate plate which is mounted on and movable diametrically of the table, a head on the said intermediate plate which is movable transversely with respect to the table, and a reciprocable tool holder mounted on the head.

21. In a machine of the character described, the combination of a bed-plate, a rotatably adjustable table mounted thereon, an intermediate plate which is mounted on and movable diametrically of the table, a head on the said intermediate plate which is movable transversely with respect to the table, a reciprocable tool holder mounted on the head, and means for adjusting the holder on the head.

22. In a machine of the character described, the combination of a bed-plate, a rotatably adjustable table thereon, an intermediate plate which is movable with the table and also movable diametrically thereof, a head on the said latter plate which is movable therewith and also movable at right angles to the movement of the plate, and a reciprocable tool holder mounted on the head.

23. In a machine of the character described, the combination of a bed-plate, a rotatably adjustable table thereon, an intermediate plate on the table and movable diametrically thereof, a head on the said latter plate which is movable therewith and also movable at right angles to the movement of the plate, and a reciprocable tool holder on the head which is rotatable on an axis at right angles to the axis of rotation of the head.

24. In a machine of the character described, the combination of a bed-plate, a rotatably adjustable table thereon, an intermediate plate which is movable with the table and also movable diametrically thereof, a head on the said latter plate which is movable therewith and also movable at right angles to the movement of the plate, and a reciprocating tool holder on the head which is rotatable on an axis at right angles to the axis of rotation of the head and rectilinearly movable at right angles to the plane of rectilinear movement of the head.

25. The combination of a shaping and slotting machine having a bed-plate, a pivot affording a support for the machine and around which it is movable with respect to the work, an adjustable bracket between the pivot and the bed-plate for adapting said machine for various sizes of work, means for movably supporting the machine on the work at a point remote from the pivot including a plurality of radially-disposed spindles mounted on the bed-plate and rollers on said spindles which are arranged to run on the top of the work, and devices for rotating said spindles and rollers to move the machine about its pivot.

26. A machine of the character described, comprising a rotatably adjustable head, a rotatably adjustable reciprocable tool on the head, means for feeding the tool, and a pivot disposed parallel to the axis of rotation of the head and around which the machine is movable.

27. A machine of the character described, comprising a rotatably and rectilinearly adjustable head, a reciprocable tool on the head which is rotatably adjustable on an axis at right angles to that of the head, means for moving the tool rectilinearly in a direction at right angles to the rectilinear movement of the head, and a pivot disposed parallel to the axis of rotation of the head and around which the machine is bodily movable.

28. A machine of the character described, comprising a rotatably and rectilinearly adjustable head, a reciprocable tool on the head which is rotatably adjustable on an axis at right angles to that of the head, means for moving the tool rectilinearly in a direction at right angles to the rectilinear movement of the head, a pivot disposed parallel to the axis of rotation of the head and around which the machine is bodily movable, and means for adjusting the machine to and from the pivot for adapting it for various sizes of work.

29. A machine of the character described, comprising a bed-plate adapted to rest upon the work to be operated on, a rotatably adjustable head thereon, a rotatably adjustable reciprocable tool on the head, means for feeding the tool, a pivot about which the machine is bodily movable on the work, and a bracket between the pivot and the bed-plate to which the latter is adjustably attached.

30. A machine of the character described, comprising a bed-plate, a rotatably adjustable head on the bed-plate which is rectilinearly movable in two directions transverse to the axis of rotation, a reciprocable tool on the head which is rotatable on an axis at right angles to the axis of rotation of the head, and a pivot disposed parallel to the axis of rotation of the head and around which the machine is bodily movable.

31. A machine of the character described, comprising a bed-plate which is movably supported, a rotatably adjustable head on the bed-plate which is rectilinearly adjustable in right angular directions in a plane transverse to the axis of rotation, a reciprocable tool on the head which is rotatably adjustable on an axis at right angles to the axis of rotation of the head, means for rectilinearly moving the tool on the head in a plane at right angles to the direction of rectilinear movement of the latter, and a pivot to which the bed-plate is attached and around which the machine is bodily movable.

32. A machine of the character described, comprising a tool mounted to be rectilinearly and rotatably movable, means supporting the tool whereby the latter is movable over the work, a pivot which is disposed transversely to the axis of rotation of the tool, and a connection between the pivot and the supporting means.

33. A machine of the character described, comprising a reciprocable tool, means for adjusting the tool about its line of reciprocation, means for feeding the tool in two planes at an angle to each other, and a pivot disposed parallel to one of said planes and around which the machine is adapted to be turned.

34. A machine of the character described, comprising a rotatably and rectilinearly movable head, a reciprocable tool on the head which is rotatably adjustable about a line or axis disposed transversely to the axis of rotation of the head, means for adjusting the tool around its line of reciprocation, and a pivot which is disposed parallel to the axis of rotation of the head and around which the machine is bodily movable.

35. In a machine of the character described, the combination of a bed plate, a head pivotally mounted thereon comprising two right-angularly disposed webs, one of which is parallel to the bed-plate, a reciprocable tool which moves in a plane parallel to the other web, a mounting for the tool which is rotatably and rectilinearly adjustable on the web, and means for adjusting the tool with respect to the web.

36. In a machine of the character described, the combination of a bed-plate, a head pivotally mounted thereon comprising two right angularly disposed webs, one of which is parallel to the bed-plate, a reciprocable tool on the other web which reciprocates in a plane parallel therewith, and means for adjusting the tool around its line of reciprocation.

37. In a machine of the character described, the combination of a head comprising two right angularly disposed webs, a bed-plate adjacent one web, a rotatable table on the bed-plate, a rectilinearly movable plate intermediate the table and the head, means for rectilinearly moving the head on the intermediate plate, and a reciprocable tool which is adjustably supported on the other web of the head.

38. In a machine of the character described, the combination of a head comprising two right angularly disposed webs, a bed-plate adjacent one web, a rotatable table on the bed-plate, a rectilinearly movable plate intermediate the table and the head, means for rectilinearly moving the head on the intermediate plate, a rotatably adjustable carriage on the other web of the head, a slide which is movable diametrically of the carriage, a reciprocable tool on the slide, and means for adjusting the tool around its line of reciprocation.

39. In a machine of the character described, the combination of a pivotally and rectilinearly adjustable head, a reciprocating motor having a cylinder and piston which is rotatably and longitudinally movable in said cylinder, a mounting for the motor which is pivotally and rectilinearly adjustable on the head, a tool holder connected with the reciprocating element of the motor, and means carried by the motor for rotating said element to angularly adjust the tool holder.

40. In a machine of the character described, the combination of a head which is adjustably mounted, a reciprocating fluid actuated motor having a cylinder and a piston which is rotatably and longitudinally movable in said cylinder, a mounting for the motor which is rotatably and rectilinearly adjustable on the head, means for adjusting the motor on the head, a tool holder connected with the reciprocating element of the motor, a device for rotating said element to adjust the holder about its line of reciprocation, and an automatically actuated valve mechanism for the motor which is carried by the latter and is adjustable therewith.

41. In a machine of the character described, the combination of a head which is adjustably mounted, a reciprocating fluid actuated motor, a mounting for the motor which is rotatably and rectilinearly adjustable on the head, means for adjusting the motor on the head, said motor comprising a cylinder and a piston which is rotatably and longitudinally movable in said cylinder, a tool holder connected with the reciprocating element of the motor, and a means for rotating said element to adjust the tool holder about its line of reciprocation.

42. In a machine of the character described, the combination of a bed-plate, a table pivotally mounted on the bed-plate, a reciprocable tool-holder, a tool carried thereby, a motor for reciprocating the holder and tool, and means for supporting the tool-holder on the table including devices for feeding the tool in a plurality of planes at an angle to each other.

43. In a machine of the character described, the combination of a bed-plate, a table mounted on the bed-plate, a pivotal bearing between the plate and the table about which said table may be turned, a reciprocable tool-holder, a tool carried thereby, a motor for reciprocating the holder and tool, and means for supporting the tool-holder on the table including devices for feeding the tool in two planes, one of which is parallel to the axis of the pivot and the other transverse to said axis.

44. In a machine of the character described, the combination of a reciprocable tool, a motor for reciprocating the tool in a given line, a bed-plate, a table, a pivotal bearing between the plate and the table about which said table can be adjusted to vary the position of the line of reciprocation of the tool, means for securing the table in its adjusted position on the plate, and means for supporting the tool on the table, including devices for feeding the tool in a plurality of planes at right angles to each other, and mechanism for adjusting the tool in its supporting means to present it in proper cutting relation to the surfaces of said planes.

45. The combination of a shaping and slotting machine comprising a tool and a motor device receiving energy from a given source for actuating the tool, means on which the machine is pivoted for bodily movement, mechanism mounted adjacent the machine for moving said machine about the pivot to feed the tool, means for automatically effecting the actuation of said mechanism by energy from said source when said motor device is energized, and a connection between said mechanism and the machine.

46. The combination of a shaping and slotting machine having a tool, a motor device receiving energy from a given source for actuating the tool, means for movably supporting the machine at one point by the work being operated on a pivot which supports the machine at another point, mechanism for moving the machine step-by-step about the pivot to feed the tool, a fluid actuated motor for operating the feed mechanism, and means for automatically effecting the actuation of the feed motor when said motor device is energized.

47. The combination of a shaping and slotting machine adapted to be movably supported at one point by the work to be operated on, with a pivot which pivotally supports the machine at another point, an automatically-actuated step-by-step feed mechanism which is adapted to be adjustably mounted on the work, and a connection between the feed mechanism and the machine whereby the machine is moved with respect to the work.

48. The combination of a shaping and slotting machine, which includes a reciprocating fluid motor, means for pivotally supporting the machine, and a feed mechanism for moving the machine around the pivot which comprises a step-by-step device, a fluid motor for actuating the said device, and a common means for supplying motive fluid to both motors.

49. The combination of a shaping and slotting machine, which includes a reciprocable tool and a fluid actuated motor therefor, with a pivot arranged in fixed relation to the work which supports the machine, and a mechanism for feeding the machine in a curvilinear path over the work, said mechanism comprising a step-by-step operating device, a fluid-actuated motor for actuating the said device, and a supply valve common to both motors.

50. The combination of a shaping and slotting machine, which includes a reciprocable tool and a motor therefor, with a pivot arranged in fixed relation to the work which supports the machine, and a mechanism for feeding the machine in a curvilinear path over the work, said mechanism comprising a step-by-step operating device, which is adjustably mounted on the work, a motor for actuating the said device, a supply valve common to both motors, and a flexible connection between the supply valve and the motor for the step-by-step operating device.

51. The combination of a shaping and slotting machine, which includes a reciprocable tool, and a motor therefor, a pivot arranged in fixed relation to the work which supports the machine, and a mechanism for feeding the machine in a curvilinear path over the work, said mechanism comprising a step-by-step operating device, a motor for actuating the said device, and a supply valve common to both motors, and means for feeding the machine independently of the step-by-step operating device.

52. The combination of a shaping and slotting machine, which includes a reciprocable tool, and a motor therefor, a pivot adapted to engage the work and around which the machine may be fed, and a feed mechanism which comprises an abutment adapted to engage the work, a screw and nut power transmitting connection between the abutment and the machine, a manually actuated means for operating the movable member of said connection, a motor for also actuating said member, and means for intermittently supplying motive fluid to both motors to progressively feed the machine with respect to the work during the operation of the tool.

In witness whereof, I have hereunto set my hand this fourth day of October, 1905.

JOHN RIDDELL.

Witnesses:
EDWARD WILLIAMS, Jr.,
MARGARET E. WOOLLEY.